United States Patent
Kan et al.

(10) Patent No.: US 7,242,668 B2
(45) Date of Patent: Jul. 10, 2007

(54) NETWORK MONITORING SYSTEM RESPONSIVE TO CHANGES IN PACKET ARRIVAL VARIANCE AND MEAN

(75) Inventors: Chao Kan, Frisco, TX (US); Aziz Mohammed, Plano, TX (US); Wei Hao, Richardson, TX (US); Jimin Shi, Plano, TX (US)

(73) Assignee: Alcatel Lucent, Paris (FR)

( * ) Notice: Subject to any disclaimer, the term of this patent is extended or adjusted under 35 U.S.C. 154(b) by 1000 days.

(21) Appl. No.: 10/412,127

(22) Filed: Apr. 11, 2003

(65) Prior Publication Data

US 2004/0090923 A1 May 13, 2004

Related U.S. Application Data

(60) Provisional application No. 60/424,495, filed on Nov. 7, 2002.

(51) Int. Cl.
*G01R 31/08* (2006.01)
(52) U.S. Cl. .................................. 370/234; 370/236
(58) Field of Classification Search ............... None
See application file for complete search history.

(56) References Cited

U.S. PATENT DOCUMENTS 5,343,465 A * 8/1994 Khalil .................... 370/232

OTHER PUBLICATIONS

Riccardo Gusella, "Characterizing the Variability of Arrival Processes with Indexes of Dispersion," IEEE Journal on Selected Areas in Communication, vol. 9, No. 2, Feb. 1991, pp. 203-211.

* cited by examiner

*Primary Examiner*—Chau Nguyen
*Assistant Examiner*—Christopher Grey
(74) *Attorney, Agent, or Firm*—Craig A. Hoersten; Anderson, Levine & Lintel

(57) ABSTRACT

A network monitoring system (10) for monitoring a network along which network traffic flows in a form of packets. The system comprises circuitry (36, 42) for receiving a packet communicated along the network and for determining whether the received packet satisfies a set of conditions. The system further comprises circuitry (36/30, 46), responsive to a determination that the received packet satisfies the set, for determining a measure, wherein the measure is determined over a defined time interval and comprises a ratio of packet arrival variance and a mean of packets arriving during the time interval and for comparing the measure to a threshold. Lastly, the system comprises circuitry (36, 52), responsive to the measure exceeding the threshold, for adjusting network resources.

24 Claims, 2 Drawing Sheets

NETWORK MONITORING SYSTEM RESPONSIVE TO CHANGES IN PACKET ARRIVAL VARIANCE AND MEAN

CROSS-REFERENCES TO RELATED APPLICATIONS

This application claims the benefit, under 35 U.S.C. §119(e)(1), of U.S. Provisional Application No. 60/424,495, filed Nov. 7, 2002, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a system for monitoring network performance and correcting network congestion by evaluating changes in packet arrival variance relative to mean packet arrival.

As the number of users and traffic volume continue to grow on the global Internet and other networks, an essential need has arisen to have a set of mechanisms to monitor network performance and to take corrective measures in response to falling performance. Such performance may be evaluated in various forms, including but not limited to detecting and troubleshooting network congestion. Network congestion results from mismatches between network capacity and network demand. The mismatch may be a long-term one, or at instantaneous time scales. Further, network capacity may appear to be ample when using tools that look at long-term traffic averages; however these approaches are not always suitable because a more subtle problem may arise with short bursts of packets, or peak demand. With congestion analyses mechanisms, the reliability and availability of the network nodes (e.g., IP routers) and the given internet paths can be evaluated. This is especially true for Internet Service Providers ("ISPs") seeking to comply with the Service Level Agreements ("SLAs") that they are now providing to customers. Additionally, such a need is prevalent for the underlying internet protocol ("IP") networks in the Internet.

The Internet is also evolving towards an advanced architecture that seeks to guarantee the quality of service ("QoS") for real-time applications. QoS permits the controlling of what happens to packets when there is congestion in a network, or more precisely when there is insufficient network capacity to deliver all of the offered load without any noticeable queuing delays. One type of QoS framework seeks to provide hard specific network performance guarantees to applications such as band-width/delay reservations for an imminent or future data flow. Such QoS is usually characterized in terms of ability to guarantee to an application-specified peak and average band-width, delay, jitter and packet loss. Another type is to use Class-of-Service ("CoS") such as Differentiated Services ("Diff-Serv") to represent the less ambitious approach of giving preferential treatment to certain kinds of packets, but without making any performance guarantees.

During the QoS process to provide services better than the traditional best effort, network congestion detection often becomes the starting point for the network performance analysis. In the past, a number of congestion detection and control schemes have been investigated in data networks. One congestion detection scheme uses the transport-layer protocols to infer congestion from the estimated bottleneck service time or from changes in throughput or end-to-end delay, as well as from packet drops. Specifically, the Internet has traditionally relied on mechanisms in the Transport Control Protocol ("TCP"), such as sliding window control and retransmission timer deficiencies to avoid congestion. TCP operates to seek excess bandwidth by increasing transmission rates until the network becomes congested and then reducing transmission rate once congestion occurs. A few limitations arise from this approach. First, TCP congestion detection at a first node requires an acknowledgement from a second node, that is, the increased transmission is continued until no acknowledgement is received from the second node; thus, a feedback communication is required from another node and that feedback also utilizes bandwidth on the network. Second, in its effort to identify bandwidth, TCP necessarily causes the very congestion which it then seeks to minimize, where the congestion is caused as the TCP increases the bandwidth to a point that exceeds the network capacity. Another type of congestion detection scheme is to involve network components such as routers in the entire process. As most network congestion occurs in routers, they may be considered an ideal position to monitor network load and congestion and respond thereto in a control scheme. Such network-based congestion control uses explicit signaling between routers to provide feedback congestion information to a transmitting router, where the transmitting router may then alter its behavior in response to the feedback, or an overall scheme can change the packet processing within one or more routers so as to reduce congestion. In any event, this latter scheme also requires a form of feedback from a recipient router, thereby increasing traffic on the network to accommodate the feedback and also requiring the reliance of the transmitting router on the integrity of a different router.

In view of the above, there arises a need to address the drawbacks of the prior art, as is accomplished by the preferred embodiments described below.

BRIEF SUMMARY OF THE INVENTION

In the preferred embodiment, there is a network monitoring system along which network traffic flows in a form of packets. The system comprises circuitry for receiving a packet communicated along the network and for determining whether the received packet satisfies a set of conditions. The system further comprises circuitry, responsive to a determination that the received packet satisfies the set, for determining a measure and circuitry for comparing the measure to a threshold, wherein the measure is determined over a defined time interval and comprises a ratio of packet arrival variance and a mean of packets arriving during the time interval. Lastly, the system comprises circuitry, responsive to the measure exceeding the threshold, for adjusting network resources.

Other aspects are also described and claimed.

DETAILED DESCRIPTION OF THE INVENTION

Figure 1:
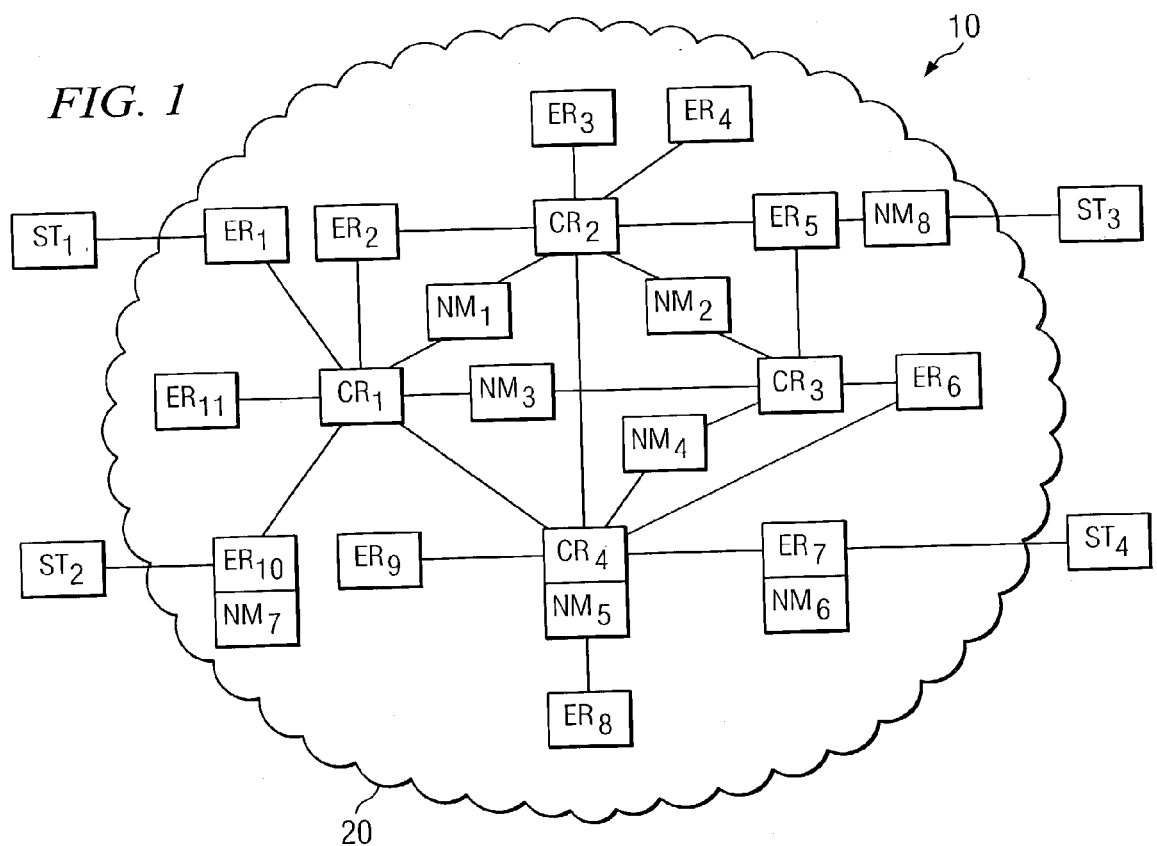
FIG. 1 illustrates a block diagram of a network system 10 into which the preferred embodiments may be implemented.

FIG. 1 illustrates a block diagram of a system 10 into which the preferred embodiments may be implemented. System 10 generally includes a number of stations $ST_1$ through $ST_4$, each coupled to a network 20 via a router, and each operable to send packets as a source or receive packets as a destination. By way of example, network 20 is an internet protocol ("IP") network such as the global Internet or other IP-using network, where each station and IP networks in general are well known in the art. One skilled in the art should appreciate that the use of the IP protocol is by way of illustration, and many of the various inventive teachings herein may apply to numerous other protocols, including by way of examples asynchronous transfer mode ("ATM"), token ring, Novell, Apple Talk, and still others. In any event, returning to network 20 as an IP network, and also by way of an example, each station $ST_x$ may be constructed and function as one of various different types of computing devices, all capable of communicating according to the IP protocol. Lastly and also by way of example, only four stations $ST_x$ are shown so as to simplify the illustration and example, where in reality each such station may be proximate other stations (not shown) and at a geography located at a considerable distance from the other illustrated stations.

Continuing with FIG. 1, along the outer periphery of network 20 are shown a number of edge routers $ER_1$ through $ER_{11}$, while within network 20 are shown a number of core routers $CR_1$ through $CR_4$. The terms edge router and core router are known in the art and generally relate to the function and relative network location of a router. Typically, edge routers connect to remotely located networks and handle considerably less traffic than core routers. In addition and due in part to the relative amount of traffic handled by core routers, they tend to perform less complex operations on data and instead serve primarily a switching function; in other words, because of the tremendous amount of throughput expected of the core routers, they are typically hardware bound as switching machines and not given the capability to provide operations based on the specific data passing through the router. Indeed, core routers typically do not include much in the way of control mechanisms as there could be 10,000 or more connections in a single trunk. Further, typically core routers do not involve their operations with TCP related items and instead deal at the IP level and below. In contrast, edge routers are able to monitor various parameters within data packets encountered by the respective router. In any event, the various routers in FIG. 1 are shown merely by way of example, where one skilled in the art will recognize that a typical network may include quite a different number of both types of routers. Finally, note that each core router $CR_x$ and each edge router $ER_x$ may be constructed and function according to the art, with the exception that preferably selected ones of those routers may include additional functionality for purposes of traffic congestion detection and response based on packet arrival variance and mean as described later. In addition, selected routers may be further constructed to respond to the traffic congestion detection that the router determines as well as in response to the traffic congestion detection of another router in network 20. Moreover, in one approach, core routers may be configured to respond differently than edge routers in the case of detecting traffic congestion.

Completing the discussion of FIG. 1, note that the various stations, edge routers, and core routers therein are shown connected to one another in various fashions and also by way of example. Such connections are intended to illustrate an example for later discussion of the preferred operation and also to reflect a general depiction of how networks are generally established. Thus, each station $ST_x$ is shown connected to a single edge router $ER_x$, where that edge router $ER_x$ is connected to one or more core routers $CR_x$. The core routers $CR_x$, also by way of example, are shown connected to multiple ones of the other core routers $CR_x$. By way of reference, the following Table 1 identifies each station and router shown in FIG. 1 as well as the other device(s) to which each is connected.

TABLE 1

| station or router | connected nodes |
|---|---|
| $ST_1$ | $ER_1$ |
| $ST_2$ | $ER_{10}$ |
| $ST_3$ | $ER_5$ |
| $ST_4$ | $ER_7$ |
| $ER_1$ | $ST_1$; $CR_1$ |
| $ER_2$ | $CR_1$; $CR_2$ |
| $ER_3$ | $CR_2$ |
| $ER_4$ | $CR_2$ |
| $ER_5$ | $ST_3$; $CR_2$; $CR_3$ |
| $ER_6$ | $CR_3$; $CR_4$ |
| $ER_7$ | $ST_4$; $CR_4$ |
| $ER_8$ | $CR_4$ |
| $ER_9$ | $CR_4$ |
| $ER_{10}$ | $ST_2$; $CR_1$ |
| $ER_{11}$ | $CR_1$ |
| $CR_1$ | $ER_1$; $ER_{11}$; $ER_{10}$; $ER_2$; $CR_2$; $CR_3$; $CR_4$ |
| $CR_2$ | $ER_2$; $ER_3$; $ER_4$; $CR_1$; $CR_3$; $CR_4$; $ER_5$ |
| $CR_3$ | $ER_5$; $ER_6$; $CR_2$; $CR_1$; $CR_4$ |
| $CR_4$ | $ER_7$; $ER_8$; $ER_9$; $CR_1$; $CR_2$; $CR_3$; $ER_6$ |

Given the various illustrated connections as also set forth in Table 1, in general IP packets flow along the various illustrated paths of network 20, and in groups or in their entirety such packets are often referred to as network traffic. In this regard and as developed below, the preferred embodiments operate to identify and respond to congestion in such network traffic. Finally, note that FIG. 1 may represent a simplified version of a network or the Internet in that only a few stations and routers are shown, while one skilled in the art will readily appreciate that the inventive concepts in this document may be applied to a larger number of stations, routers, and the network interconnectivity between those devices.

FIG. 1 also illustrates a number of network monitors $NM_1$ through $NM_8$ according to the preferred embodiments, where the choice of eight such network monitors is only by way of example given the amount of other hardware that is shown for network 20. As detailed below, each network monitor $NM_x$ is operable to sample each packet that is received along the conductor(s) to which the network monitor is connected, and if corrective action is deemed as useful then a routing table associated with a router that is also associated with the network monitor $NM_x$ may be modified to improve network performance. The components of each network monitor $NM_x$ are described below, but at this point the connections of each such monitor are noted in the following Table 2:

TABLE 2

| network monitor | connected nodes |
| --- | --- |
| $NM_1$ | $CR_1$; $CR_2$ |
| $NM_2$ | $CR_2$; $CR_3$ |
| $NM_3$ | $CR_1$; $CR_3$ |
| $NM_4$ | $CR_3$; $CR_4$ |
| $NM_5$ | $CR_1$; $CR_2$; $CR_3$; $ER_7$; $ER_8$; $ER_9$ |
| $NM_6$ | $CR_4$; $ST_4$ |
| $NM_7$ | $ST_2$; $CR_1$ |
| $NM_8$ | $ER_5$; $ST_3$ |

FIG. 1 and Table 2 demonstrate that each of network monitors $NM_1$ through $NM_4$ and $NM_8$ is connected to sample packets passing along the conductor(s) between a pair of nodes, such as between routers or between a router and a station. However, network monitors $NM_5$, $NM_6$, and $NM_7$ are each by way of alternative examples incorporated into respective routers $CR_4$, $ER_7$, and $ER_{10}$. As a result, each of network monitors $NM_5$, $NM_6$, and $NM_7$ is able to sample packets communicated with any of the nodes to which its respective router is connected; for example with respect to network monitor $NM_5$, it may sample packets communicated with respect to any node to which core router $CR_4$ is connected, namely, core routers $CR_1$, $CR_2$, $CR_3$, and edge routers $ER_7$, $ER_8$, and $ER_9$. Thus, the contrast of network monitors $NM_5$, $NM_6$, and $NM_7$ to the other illustrated network monitors $NM_1$ through $NM_4$ is shown to demonstrate that in the preferred embodiment each network monitor $NM_x$ may sample packets as a stand alone entity or may be combined with the hardware and software of an existing router; indeed, in the preferred embodiments a network monitor $NM_x$ also may be combined with network or element management systems. In any event and by way of introduction to details provided later, in the preferred embodiments the sampling functionality of each network monitor $NM_x$ permits real-time monitoring, over a defined period of time, of a ratio of the packet arrival variance and mean for selected packets, and in response determinations may be made, and actions may be taken, based on thresholds exceeded by the ratio, thereby presenting an indication of likely network traffic congestion.

Figure 2:
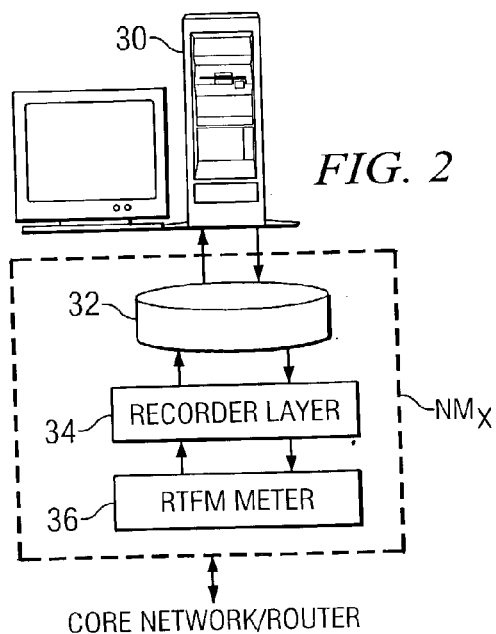
FIG. 2 illustrates a block diagram of each network monitor $NM_1$ through $NM_8$ of FIG. 1.

FIG. 2 illustrates a block diagram of each network monitor $NM_1$ through $NM_4$ and $NM_8$ of FIG. 1, with the further understanding that functionally the following description also may be applied to any of network monitors $NM_5$, $NM_6$, and $NM_7$, with the addition that certain functionality may be provided by the hardware and software already available from each respective router $CR_4$, $ER_7$, and $ER_{10}$. Turning then to FIG. 2, a console 30 is associated with network monitor $NM_x$, where in the preferred embodiment a single such console 30 communicates with multiple network monitors $NM_x$. For example, returning briefly to FIG. 1, preferably each of network monitors $NM_1$ through $NM_8$ communicates with a single console 30, where such communications also may be by way of packets between console 30 and the network monitors $NM_x$. Console 30 may be constructed by one skilled in the art using various forms of hardware and software, where the selection is a matter of implementation choice in order to achieve the functionality described in this document. Turning to that functionality, console 30 preferably provides an administration (configuration) function and a reporting function. To permit a user to perform these functions, various interfaces may be used such as a graphical Web-based configuration tool or a command line tool, where one preferable approach implements console 30, by way of example, using the Apache Web server with the PHP server-side scripting language to provide a dynamic interface to a flow store 32. In any event, the user interface preferably provides different screens for each of the administration and reporting functions. The actual interface and screens, however, may be implemented in various forms, where it is desirable for any form that an operator may properly control console 30 to perform its administration and reporting functions with respect to its flow store 32. Preferably, a network administrator or the like uses the administration functionality of console 30 to create a set of rules and to provide those rules, along with a methodology for determining an index dispersion for counts ("IDC") and responding thereto, to an RTFM meter 36 described later. By way of introduction, the set of rules causes meter 36 to store packet arrival time for each packet that satisfies one (or more) of the provided rules, that is, those packets are selected from among all packets that pass through the meter with the arrival time of such selected packets being recorded; thereafter, meter 36 determines the IDC for the selected packets over a specified time interval t. Also, once the system is configured and left to collect packet arrival about the monitored packets, the network administrator can use the reporting screen to query the information so as to generate network status reports based on the collected information and to thereby analyze network congestion.

As introduced above, console 30 is connected to a flow store 32, which preferably represents a storage medium that stores a flow database relating to monitored packets. In the preferred embodiment, each network monitor $NM_x$ includes its own flow database, although alternative embodiments may be created where more than one network monitor $NM_x$ shares a common flow database. In the preferred embodiment the flow database in flow store 32 is an SQL-compatible database using the PostgreSQL relational database management system, although in alternative embodiments various other types of databases may be used in flow store 32. Using the preferred embodiment as an example, console 30 communicates with this database through the Web server's PHP link to the SQL database. Thus, any administration and configuration changes made via console 30 are passed directly to flow store 32. Given the preceding, one skilled in the art should appreciate that access to flow store 32 can be achieved by SQL queries, enabling network administrators to automate the configuration process or integrate report generation. As introduced above, in the preferred embodiment, flow store 32 also stores what is referred to in this document as a "rule set" (or "rule sets" when plural), which is initially provided to the flow store 32 from console 30 as part of the administration function and which is also thereby conveyed to meter 36. As shown by example below, each rule set specifies one or more criteria against which meter 36 evaluates each incoming packet to determine if the criteria are satisfied. Additionally, in one embodiment, flow store 32 may store the packet arrival information for those criteria-satisfying packets in a monitored flow so that such information may be evaluated, including the determination of IDC information and possible responses thereto, by console 30. Moreover and as also discussed below, flow store 32 may store numerous different sets of packet arrival information, each corresponding to a different set of flow criteria, that is, corresponding to one of the different specified rule sets. The stored information is therefore accessible by console 30 and permits other analyses of the flow information so as to provide information and reports that are useful for network engineering and management purposes.

Continuing with FIG. 2, recorder layer 34 provides an interface between flow store 32 and a meter 36 (or meters) in use and coupled to the network. Generally, the applications of recorder layer 34 can be separated into two categories: manager applications and meter reading applications. Manager applications configure meter 36, based on information, including rules in one or more rule sets, in flow store 32. Meter reading applications permit the data collected and/or determined by meter 36 to be provided in a data format usable by flow store 32 and, indeed, recorder layer 34 facilitates the passage of that data into the flow database of flow store 32. Recorder layer 34 applications may pass information between flow store 32 and the network probes of meter 36 either synchronously or asynchronously. This gives network administrators the flexibility of either using real-time network flow meters (i.e. NeTraMet) or importing data from other network analysis tools that are not able to provide real-time data (e.g. Cisco NetFlow data).

In the preferred embodiment, meter 36 is a Real-Time Traffic Flow Measurement ("RTFM") meter which is a concept from the Internet Engineering Task Force ("IETF"). As known in the RTFM art, RTFM meters are previously known to be used in systems for determining the service requested by IP packets that are passing through a network for purposes of collecting revenue, where such a service is identifiable by the transport port number specified in each IP packet. For example, RTFM meters are currently being considered for use in systems whereby an Internet user is charged based on the service he or she is using on the Internet; for example, a different fee may be charged to the user for each different Internet service, including mail, video, phone calls, and web browsing. However, as detailed in this document, the preferred embodiment implements the RTFM meter instead to analyze each packet and to determine if the packet satisfies a rule in the rule set and, if so, to store sufficient packet arrival time corresponding to the defined interval t so that packet IDC may be determined and used as a basis to indicate, and respond to, network congestion. Thus, in real time, meter 36 physically probes the underlying network traffic and each time meter 36 detects an IP packet on the network, it determines whether the packet satisfies a rule in the rule set(s). Also, during the real-time passage of numerous IP packets by the evaluating meter 36, meter 36 does not always copy a fixed portion of each such packet into a database such as the entire packet or the entire packet header; instead, each meter 36 evaluates the appropriate field(s) in the packet and, if a rule in the rule set(s) is satisfied, then meter 36 stores sufficient packet arrival time so that the IDC corresponding to that packet may be determined. In addition, meter 36 may store additional information about each rule set-satisfying packet, as further explored later. Returning to the aspect of meter 36 storing information to determine the packet IDC, the present inventive scope contemplates two alternatives of the actual IDC determination, namely, either meter 36 may itself determine the IDC, or meter 36 may store sufficient information and console 30 may determine the IDC from the stored information, where in either case the IDC is determined as detailed later. Further, the trade-off between these two alternative embodiment approaches is that the meter-side implementation introduces the overhead on network processors but with less messaging bandwidth overhead to meter readers. The read-side solution, on the other hand, actually functions as an application analysis component in the RTFM architecture. The overhead to the router processor is minimal but the messaging bandwidth overhead for passing raw data to the IDC monitor for computation may be unendurable.

The Index of Dispersion for Counts ("IDC") has heretofore been proposed to be used to characterize packet burstiness in an effort to model Internet traffic, whereas in contrast, in the present inventive scope IDC is instead combined with the other attributes described herein to detect and respond, in a real-time manner, to packet congestion. By way of background, in the prior art, in a document entitled "Characterizing The Variability of Arrival Processes with Index Of Dispersion," (IEEE, Vol. 9, No. 2, February 1991) by Riccardo Gusella and hereby incorporated herein by reference, there is discussion of using the IDC, which provides a measure of burstiness, so that a model may be described for Internet traffic. Currently in the art, there is much debate about identifying the type of model, whether existing or newly-developed, which will adequately describe Internet traffic. In the referenced document, IDC, as a measure of burstiness, is suggested for use in creating such a model. IDC is defined as the variance of the number of packet arrivals in an interval of length t divided by the mean number of packet arrivals in t. For example, assume that a given network node has an anticipation (i.e., a baseline) of receiving 20 packets per second ("pps"), and assume further that in five consecutive seconds this node receives 30 packets in second 1, 10 packets in second 2, 30 packets in second 3, 15 packets in second 4, and 15 packets in second 5. Thus, over the five seconds, the node receives 100 packets; on average, therefore, the node receives 20 packets per second, that is, the average receipt per second equals the anticipated baseline of 20 pps. However, for each individual second, there is a non-zero variance in the amount of packets received from the anticipated value of 20 pps. For example, in second 1, the variance is +10, in second 2 the variance is −10, and so forth. As such, the IDC provides a measure that reflects this variance, in the form of a ratio compared to its mean, and due to the considerable fluctuation of the receiving rate per second over the five second interval, there is perceived to be considerable burstiness in the received packets, where the prior art describes an attempt to compile a model of this burstiness so as to model Internet traffic.

Looking now to the preferred embodiment, it uses IDC not solely as a predicate for Internet traffic modeling, but instead to provide an ongoing determination of whether selected packet traffic is causing congestion, where such congestion is detected in part in response to a threshold-exceeding IDC, and preferably further in view of additional considerations, such as in relation to quality of service ("QoS"). Having thus introduced IDC in its past application as well as in the present inventive scope, its actual determination is now explored in greater detail. Recalling that the IDC is defined as the variance of the number of packet arrivals in an interval of length t divided by the mean number of packet arrivals in t, it may be written as shown in the following Equation 1:

$$IDC_t = \frac{\text{var}(N_t)}{E(N_t)} \qquad \text{Equation 1}$$

In Equation 1, $N_t$ indicates the number of arrivals in an interval of length t. In the preferred embodiment and for estimating the IDC of measured arrival processes, only considered are the time at discrete, equally spaced instants $\tau_i$ ($i \geq 0$). Further, letting $c_i$ indicate the number of arrivals in the time interval $\tau_i - \tau_{i-1}$, then the following Equation 2 may be stated:

$$IDC_n = \frac{\mathrm{var}\left(\sum_{i=1}^{n} c_i\right)}{E\left(\sum_{i=1}^{n} c_i\right)} = \frac{\mathrm{var}(c_1 + c_2 + \cdots + c_n)}{E(c_1 + c_2 + \cdots + c_n)} = \frac{n \cdot \mathrm{var}(c_\tau) + 2\sum_{j=1}^{n-1}\sum_{k=1}^{n-j} \mathrm{cov}(c_j, c_{j+k})}{n \cdot E(c_\tau)}$$

Equation 2

In Equation 2, $\mathrm{var}(c_\tau)$ and $E(c_\tau)$ are the common variance and mean of $c_i$, respectively, thereby assuming implicitly that the processes under consideration are at least weakly stationary, that is, that their first and second moments are time invariant, and that the auto-covariance series depends only on the distance k, the lag, between samples: $\mathrm{cov}(c_i, c_{i+k}) = \mathrm{cov}(c_j, c_{j+k})$, for all i, j, and k.

Further in view of Equations 1 and 2, consider the following Equation 3:

$$\sum_{j=1}^{n-1}\sum_{k=1}^{n-j} \mathrm{cov}(c_j, c_{j+k}) = \text{sum of} \begin{cases} j=1, & \mathrm{cov}(1) + \mathrm{cov}(2) + \cdots + \mathrm{cov}(n-2) + \mathrm{cov}(n-1) \\ j=2, & \mathrm{cov}(1) + \mathrm{cov}(2) + \cdots + \mathrm{cov}(n-2) \\ \vdots & \vdots \\ j=n-2, & \mathrm{cov}(1) + \mathrm{cov}(2) \\ j=n-1, & \mathrm{cov}(1) \end{cases}$$

$$= \sum_{j=1}^{n-1} (n-j)\mathrm{cov}(j)$$

Equation 3

Further, for the auto-correlation coefficient $\xi_{i, j+k}$, it may be stated as in the following Equation 4:

$$\xi_{i,i+k} = \xi_k = \frac{\mathrm{cov}(c_i, c_{i+k})}{\sqrt{\mathrm{var}(c_i)}\sqrt{\mathrm{var}(c_{i+k})}} = \frac{\mathrm{cov}(k)}{\mathrm{cov}(c_\tau)}$$

Equation 4

Then from Equation 4, the following Equation 5 may be written:

$$I_n = \frac{n \cdot \mathrm{var}(c_\tau) + 2\sum_{j=1}^{n-1}\sum_{k=1}^{n-j} \mathrm{cov}(c_j, c_{j+k})}{n \cdot E(c_\tau)} = \frac{\mathrm{var}(c_\tau)}{E(c_\tau)}\left[1 + 2\sum_{j=1}^{n-1} \frac{n-j}{n}\xi_j\right]$$

$$= \frac{\mathrm{var}(c_\tau)}{E(c_\tau)}\left[1 + 2\sum_{j=1}^{n-1}\left(1 - \frac{j}{n}\right)\xi_j\right] \text{ by using } \mathrm{cov}(k) = \xi_k \cdot \mathrm{var}(c_\tau)$$

Equation 5

Finally, therefore, the unbiased estimate of $E(c_\tau)$, $\mathrm{var}(c_\tau)$, and $\xi_j$ are as shown in the following respective Equations 6 through 8:

$$E(c_\tau) = \frac{1}{n}\sum_{i=1}^{n} c_i$$

Equation 6

$$\mathrm{var}(c_\tau) = \frac{1}{n-1}\sum_{i=1}^{n}(c_i - E(c_\tau))^2$$

Equation 7

$$\xi_j = \frac{\mathrm{cov}(j)}{\mathrm{var}(c_\tau)} = \frac{\frac{1}{n-j}\sum_{i=1}^{n-j}(c_i - E(c_\tau))(c_{i+j} - E(c_\tau))}{\mathrm{var}(c_\tau)}$$

Equation 8

Thus, the IDC may be determined by the preferred embodiment using Equations 6 and 7, and further in view of Equation 8.

Figure 3:
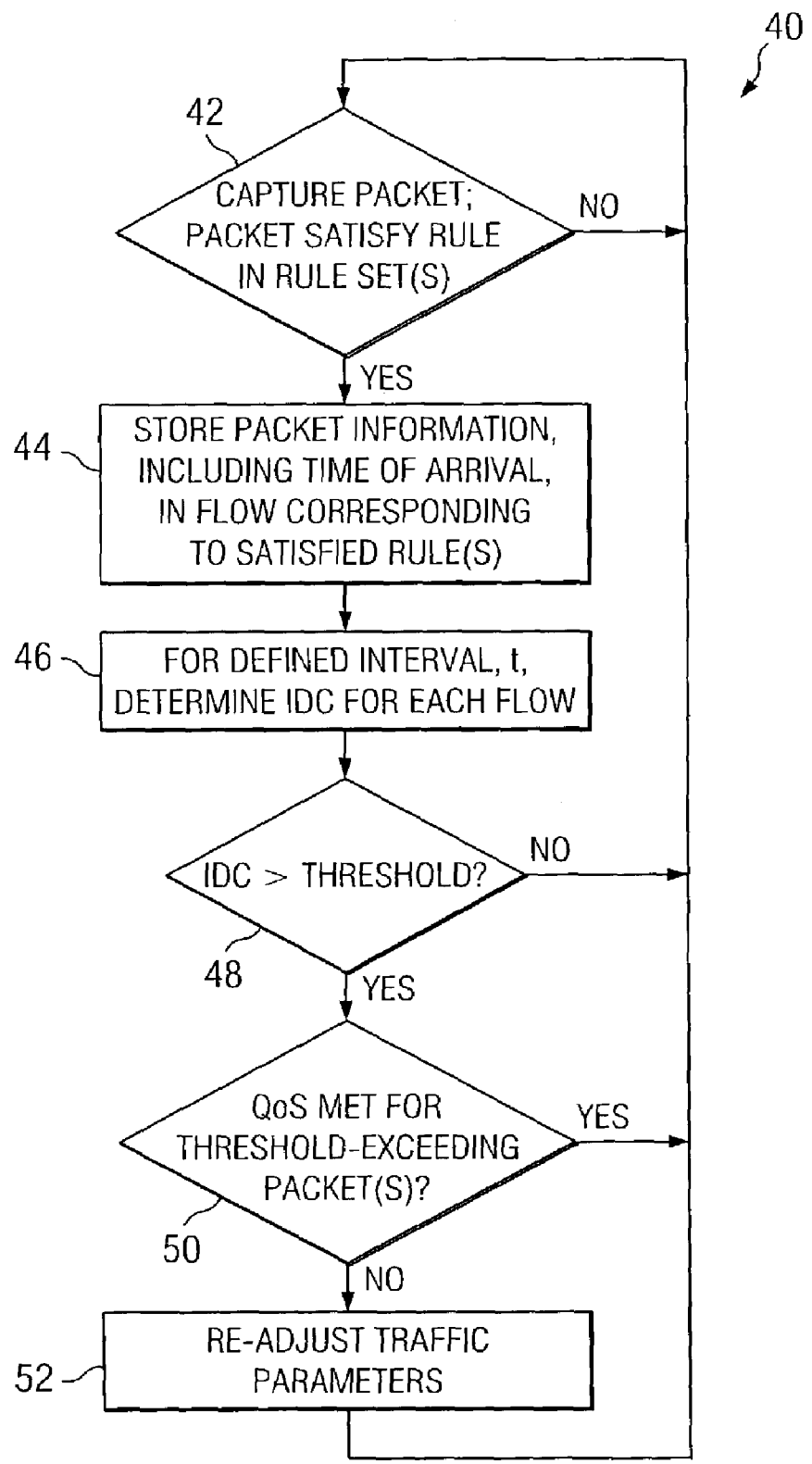
FIG. 3 illustrates a flow chart of the operation of each network monitor $NM_1$ through $NM_8$ of FIG. 2.

FIG. 3 illustrates a flow chart of an overall method 40 of operation for each network monitor $NM_x$ of FIGS. 1 and 2. While method 40 is described below with respect to a single network monitor $NM_x$, preferably each network monitor $NM_x$ performs a comparable method at its respective location in network 20. As a result, distributed operations occur at different network locations, where by way of example the results of each individual network monitor $NM_x$ may be accumulated by a common resource, such as at a single console 30. From this accumulated information, greater accuracy may be achieved in identifying network congestion as well as making adjustments to traffic in response to such congestion.

Turning to method 40, in step 42 a network monitor $NM_x$ according to the preferred embodiment captures a network packet, that is, a packet is received along a conductor to which the monitor is connected. Further and in response, in step 42 the network monitor $NM_x$ determines whether the packet satisfies a rule in the rule set or sets stored in flow store 32. For example, assume that flow store 32 stores two rules sets directed to FIG. 1, where the first rule set specifies any packet originating from station $ST_1$ as a source and traveling to station $ST_3$ as a destination, and where the second rule set specifies any packet originating from station $ST_2$ as a source and traveling to station $ST_4$ as a destination. Thus, in step 42, for the captured packet, a determination is made from the source and destination addresses, in the packet header, as to whether they satisfy the conditions of either of these two rules. Note also that source and destination addresses are only provided by way of example, where in the preferred embodiment the rules may be directed to other aspects set forth in the packet header, including by ways of example the protocol field, type of service ("TOS") field, or source/destination port numbers. Moreover, packet attributes about each packet other than that specified in the packet header also may be specified in the rule set(s), in which case in response network monitor $NM_x$ evaluates the captured packet to determine if the specified attribute is satisfied. In any event, if no rule is satisfied, then method 40 returns to the beginning of step 42 to await the capture of a next packet. However, if a rule is (or rules are) satisfied, then method 40 continues from step 42 to step 44.

In step 44, the network monitor $NM_x$ stores in flow store 32 certain information relating to the rule set-satisfying packet that was detected in step 42 in flow store 32, where the stored information may be referred to as a flow table. In the preferred embodiment, the stored packet information includes sufficient data to later determine the IDC for the packet, where such information therefore may include the packet time of arrival. In addition, the stored information either explicitly or implicitly identifies which rule(s) the packet at issue satisfied. If the packet at issue is the first to satisfy one of the rules, then a new flow entry is created in flow store 32 corresponding to the satisfied rule and identifying the subject packet, whereas if one or more previous packets have already satisfied that same rule and therefore a flow entry already has been created in flow store 32 for that rule, then the information from the present packet is added to that flow entry. Still further and for reasons detailed later, other packet information may be stored such as the packet's differentiated service control points ("DSCP") and its TOS field. In any event, the flow table may be accessed by console 30, such as by using Simple Network Management Protocol ("SNMP"). After step 44, method 40 continues to step 46.

In step 46, the IDC over a defined time interval, t, is determined for one or more flows in flow store 32. As mentioned above, the IDC may be determined either by the RTFM meter 36 of the network monitor $NM_x$ or, alternatively, it may be determined by console 30 in response to its access to flow store 32. In any event, after the IDC determination, method 40 continues to step 48.

In step 48, the IDC determined from step 46 is compared to a threshold, where in the preferred embodiment the threshold is established at a value that presupposes that an IDC equal to or greater than the threshold is an indication of congestion in the traffic flow corresponding to the IDC value. Thus, if the IDC does not exceed the threshold, then method 40 returns from step 48 to step 42 to await the capture of another packet. However, if the IDC exceeds the threshold, then the packets corresponding to that excessive IDC are considered to be potentially congestion-causing packets and in response to the identification of those packets method 40 continues from step 48 to step 50. Note that this latter direction of flow may be implemented in various fashions. For example, in one embodiment the step 48 comparison may be made by the network monitor $NM_x$ which, in the instance of the IDC exceeding the threshold, issues a trap or other indication to console 30 to identify the packet flow that corresponds to the excessive IDC. Also in this case, the network monitor $NM_x$ preferably reports other information regarding those same packets, such as the packets' DSCPs or TOS. In an alternative embodiment, console 30 itself may make the step 48 comparison, and respond as shown in the flow of FIG. 3 and as further described below.

In step 50, having been reached because the IDC for one or more flows exceeds the step 48 threshold, console 30 preferably determines whether the packets, which correspond to the flow having the excessive IDC, satisfy the QoS required of those packets. More particularly, therefore, given that certain packet information (e.g., DSCP, TOS) has been reported to console 30 or is readable by console 30 and corresponds to the potentially congesting packets, then console 30 checks this packet information against the corresponding QoS requirements for those packet flows. In other words, under contemporary operations, these packets likely have QoS requirements imposed on them, and step 48 determines whether that QoS is being satisfied. Note further in this regard that the QoS requirements imposed on the packets may be determined in various fashions, such as by looking to a Service Level Agreement ("SLA") that exists between an internet service provider ("ISP") and its client; in other words, step 50 in one approach maps the SLA or specifications guaranteed to the customer into a corresponding set of QoS requirements, and those QoS requirements are then compared to the flow(s) that corresponded to a threshold-exceeding IDC. If the QoS requirements are satisfied, then method 40 returns from step 50 to step 42, whereas if the QoS requirements are not satisfied, then method 40 continues from step 50 to step 52.

In step 52, the network monitor $NM_x$ re-adjusts traffic parameters in an effort to reduce congestion and to correspondingly improve the chances that the QoS requirements discussed in connection with step 50 will be met for future traffic in the identified flow. For example, in connection with the network monitor $NM_x$, a function, such as may be referred to as a router shaping and scheduling module, checks the available internal resources to optimize various flow queues and starts flow shaping algorithms, with the goal that for future packets the QoS requirements are satisfied. Note that this module may be constructed by one skilled in the art given the stated goals and in view of the potentially-available internal resources that may be adjusted so as to improve traffic flow. As one preferred example, routers typically include various buffers or buffering mechanisms with respect to received packets and from which packets are forwarded on to the network; thus, one type of resource that may be adjusted is the re-allocation of which packets are stored in which buffers or in which portions of those buffers. Moreover, in response to the determination of the router shaping and scheduling module, the network monitor $NM_x$ also preferably includes some type of low-level control in the router that adjusts the flow on the outgoing data packet so as to reduce the chances of traffic congestion as previously potentially caused by such packets. In other words, after these adjustments, it is the goal of the preferred embodiment that the IDC for such packets as they are passed onward on the network will be reduced, and their QoS compliance will be improved. Lastly, note that the preceding discussion of re-adjusting traffic parameters by a given network monitor $NM_x$ may be more preferable in the case when such a monitor is combined with a router (e.g., FIG. 1, $NM_5$, $NM_6$, $NM_7$), whereby the monitor may make the adjustment with respect to its own corresponding router; thus, where method 40 is implemented in the stand-alone network monitors that are not part of a router, those monitors may operate solely to collect information so as to monitor packet arrival, IDC, and possibly QoS compliance, without necessarily by themselves causing a re-adjustment in traffic parameters.

From the above illustrations and description, one skilled in the art should appreciate that the preferred embodiments provide a manner of monitoring the flow of network packets to potentially detect congestion in certain packets, where the scope of investigated packets are specified by one or more rule sets that are provided to a meter, and where the meter is preferably a real-time device. The embodiments provide numerous benefits over the prior art. As one example, in contrast to the TCP approach wherein bandwidth is increased to cause congestion, the preferred embodiment operates in a more passive sense so as not to cause congestion. As another example, each network meter can operate independently to evaluate possible congestion and without reliance on the integrity of a different router or the connections to such a router. As still another example of a benefit, unlike the prior art active systems, the preferred embodiments do not send special test packets (e.g., PING) and do not introduce additional test traffic onto the route of the regular data packets. Thus, in this sense the preferred embodiments do not impact the network performance. As another example of a benefit, as compared to the traditional passive measurement mechanisms in which the IP packets (or portions thereof) are routinely stored and then later studied using an off-line analysis of historical data, the preferred embodiments use real-time RTFM meters to retrieve packet information from packets as they are incurred during actual real-time traffic flow and to store portions of those packets; this stored data is also preferably used in a real-time or near real-time manner, such as on the order of less than one second of when the packet information is collected, to detect whether traffic congestion is occurring in the identified flows and to take corrective action(s), if necessary. As still another example of a benefit, for a prior art management information database ("MIB"), it typically provides single point analysis directed to the traffic flow at the location of the MIB. In contrast, the preferred embodiments contemplate analyzing real-time collected packet information from multiple points in the network and they are not constrained to the hardware type or manufacturer of each router. Still further, the preferred embodiments also provide numerous benefits inherited from the following intrinsic advantages of RTFM meter architecture: (1) all data on the IP network is recordable; (2) functional even when the given network elements are incapable of flow monitoring; (3) independence from physical and data layer technologies; and (4) good performance even during fault conditions. In all events, the preceding as well as other benefits should be appreciated by one skilled in the art. As a final benefit, while the preferred embodiments are particularly advantageous in IP networks, they also may be applied to numerous other networks as well. In addition, while the present embodiments have been described in detail, various substitutions, modifications or alterations could be made to the descriptions set forth above without departing from the inventive scope which is defined by the following claims.

The invention claimed is:

1. A network monitoring system for monitoring a network along which network traffic flows in a form of packets, comprising:
  circuitry for receiving a packet communicated along the network;
  circuitry for determining whether the received packet satisfies a set of conditions;
  circuitry, responsive to a determination that the received packet satisfies the set, for determining a measure corresponding to the set, wherein the measure is determined over a defined time interval and comprises a ratio of packet arrival variance and a mean of packets arriving during the time interval;
  circuitry for comparing the measure to a threshold; and
  circuitry, responsive to the measure exceeding the threshold, for adjusting network resources.

2. The system of claim 1 and further comprising circuitry for determining whether the received packet complies with a set of corresponding quality requirements imposed on the packet, wherein the circuitry for adjusting is further responsive to the received packet not complying with the corresponding set of quality requirements.

3. The system of claim 2 wherein the received packet comprises an IP packet and wherein the quality requirements comprise QoS.

4. The system of claim 2 and further comprising a database, wherein the database comprise the set of conditions.

5. The system of claim 2 wherein the set of conditions relate to at least one criterion selected from a set consisting of source address and destination address.

6. The system of claim 2 wherein the set of conditions relate to at least one criterion selected from a set consisting of source address, destination address, protocol field, type of service field, source port number, and destination port number.

7. The system of claim 2 wherein the set of conditions relate to at least one criterion relating to an attribute of the received packet that is not provided as data included in the received packet.

8. The system of claim 2 wherein the network resources comprise buffering allocation in at least one node in the network.

9. The system of claim 1:
  wherein the packet comprises one packet in a plurality of packets communicated along the network;
  wherein the circuitry for receiving is further for receiving each packet in the plurality of packets;
  wherein the circuitry for determining whether the received packet satisfies a set of conditions is for determining whether each received packet satisfies a set of conditions;
  wherein the circuitry for determining a measure is further responsive to a determination that each received packet satisfies the set, and for each packet that satisfies the set the circuitry for determining a measure is for determining a respective measure corresponding to the set, wherein the respective measure is determined over a defined time interval and comprises a ratio of packet arrival variance and a mean of packets arriving during the time interval;
  wherein the circuitry for comparing is further for comparing each respective measure to a threshold; and
  wherein the circuitry for adjusting network resources is further responsive to a respective measure exceeding the threshold.

10. The system of claim 1:
  and further comprising a plurality of monitors;
  wherein a first monitor in the plurality of monitors comprises the circuitry for receiving and circuitry for determining whether the received packet satisfies a set of conditions;
  wherein each monitor in the plurality of monitors comprises:

circuitry for receiving a packet communicated along the network; and circuitry for determining whether the received packet satisfies a set of conditions.

11. The system of claim 10 wherein each monitor in the plurality of monitors further comprises:

circuitry, responsive to a determination that a received packet for the respective monitor satisfies the set, for determining a measure corresponding to the set, wherein the measure is determined over a defined time interval and comprises a ratio of packet arrival variance and a mean of packets arriving during the time interval;

circuitry for comparing the measure to a threshold; and circuitry, responsive to the measure exceeding the threshold, for adjusting network resources.

12. The system of claim 10 and further comprising circuitry, coupled to more than one monitor in the plurality of monitors, and responsive to a respective monitor determining that a packet received by the respective monitor satisfies the set, for determining a measure corresponding to the set, wherein the measure is determined over a defined time interval and comprises a ratio of packet arrival variance and a mean of packets arriving during the time interval.

13. The system of claim 1 wherein the circuitry for adjusting network resources adjusts the network resources in less than one second of a time when the packet is received by the circuitry for receiving.

14. The system of claim 1 wherein the network comprises an internet protocol network.

15. The system of claim 1 wherein the internet protocol network comprises the global internet.

16. The system of claim 1 wherein the circuitry for determining whether the received packet satisfies a set of conditions further comprising circuitry for determining whether the received packets satisfies any set of conditions in a plurality of sets of conditions.

17. The system of claim 16 wherein the circuitry for determining a measure is responsive to a determination that the received packet satisfied any set of conditions in the plurality of sets of conditions.

18. The system of claim 1 wherein the circuitry for determining whether the received packet satisfies a set of conditions comprises a real time traffic measurement meter.

19. A method of operating a network monitoring system for monitoring a network along which network traffic flows in a form of packets, comprising:

receiving a packet communicated along the network;

determining whether the received packet satisfies a set of conditions;

responsive to a determination that the received packet satisfies the set, determining a measure corresponding to the set, wherein the measure is determined over a defined time interval and comprises a ratio of packet arrival variance and a mean of packets arriving during the time interval;

comparing the measure to a threshold; and responsive to the measure exceeding the threshold, for adjusting network resources.

20. The method of claim 19 and further comprising determining whether the received packet complies with a set of corresponding quality requirements imposed on the packet, wherein the adjusting step is further responsive to the received packet not complying with the corresponding set of quality requirements.

21. The method of claim 20 wherein the received packet comprises an IP packet and wherein the quality requirements comprise QoS.

22. The method of claim 20 wherein the set of conditions relate to at least one criterion selected from a set consisting of source address and destination address.

23. The method of claim 20 wherein the set of conditions relate to at least one criterion selected from a set consisting of source address, destination address, protocol field, type of service field, source port number, and destination port number.

24. The method of claim 20 wherein the set of conditions relate to at least one criterion relating to an attribute of the received packet that is not provided as data included in the received packet.

* * * * *